(12) United States Patent
Nishikawa

(10) Patent No.: US 7,315,387 B2
(45) Date of Patent: Jan. 1, 2008

(54) PRINT CONTROL METHOD AND APPARATUS, AND PRINT SYSTEM

(75) Inventor: Satoshi Nishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 937 days.

(21) Appl. No.: 09/726,404

(22) Filed: Dec. 1, 2000

(65) Prior Publication Data

US 2002/0051169 A1 May 2, 2002

(30) Foreign Application Priority Data

Dec. 1, 1999 (JP) ................................. 11-342551

(51) Int. Cl.
- G06F 15/00 (2006.01)
- G06F 1/00 (2006.01)
- G06K 15/00 (2006.01)

(52) U.S. Cl. ..................... 358/1.15; 358/1.9; 358/1.11; 358/1.15; 358/1.16; 358/1.17

(58) Field of Classification Search ............... 358/1.12, 358/1.13, 1.16, 1.14, 1.15, 1.9, 1.11, 1.17; 346/134; 399/361–410

See application file for complete search history.

(56) References Cited

U.S. PATENT DOCUMENTS

| | | | | |
|---|---|---|---|---|
| 5,105,266 A | * | 4/1992 | Telle | 358/518 |
| 5,237,923 A | * | 8/1993 | Williams et al. | 101/467 |
| 5,764,863 A | * | 6/1998 | Fall et al. | 358/1.13 |
| 6,104,498 A | * | 8/2000 | Shima et al. | 358/1.14 |
| 6,120,197 A | | 9/2000 | Kawamoto et al. | 400/61 |
| 6,147,765 A | * | 11/2000 | Yoneda | 358/1.15 |
| 6,501,562 B1 | | 12/2002 | Nakagiri et al. | 358/1.2 |
| 6,594,033 B1 | | 7/2003 | Kujirai et al. | 358/1.18 |
| 6,924,826 B1 | | 8/2005 | Nakagiri et al. | 345/700 |
| 6,934,046 B1 | | 8/2005 | Nishikawa et al. | 358/1.15 |

FOREIGN PATENT DOCUMENTS

| | | |
|---|---|---|
| JP | 5-107852 | 4/1993 |
| JP | 7-085024 | 3/1995 |
| JP | 9-27875 | 1/1997 |
| JP | 11-143667 | 5/1999 |
| JP | 11-212403 | 8/1999 |
| JP | 11-249859 | 9/1999 |
| JP | 2000-349949 | 12/2000 |
| JP | 2001-94707 | 4/2001 |

\* cited by examiner

*Primary Examiner*—Twyler Lamb
*Assistant Examiner*—Yixing Qin
(74) *Attorney, Agent, or Firm*—Fitzpatrick, Cella, Harper & Scinto

(57) ABSTRACT

A spool file (303) holds intermediate data of a print job to be executed. When a test print process is executed while designating this intermediate data, the intermediate data is converted into a command to be sent to a printer (1500), thus executing the test print process. In this case, the number of sets of copies set in the print job is decremented by 1. When an actual print process is done after the test print process, the number of sets of copies is reset to the designated value, and the print process then starts.

29 Claims, 10 Drawing Sheets

PRINT CONTROL METHOD AND APPARATUS, AND PRINT SYSTEM

FIELD OF THE INVENTION

The present invention relates to a print control method and apparatus and, more particularly, to a print control method and apparatus having a test print function in a system which comprises an information processing apparatus such as a personal computer, and a printer or a hybrid machine.

BACKGROUND OF THE INVENTION

Conventionally, some print systems each of which comprises an information processing apparatus such as a personal computer or the like, and a printing apparatus such as a printer, a hybrid machine, or the like have a test print mechanism for spooling rasterized data in a hard disk or the like of the printing apparatus and executing a test print process using the spooled data.

Such print system can change print setups such as designation of a finishing function including a sort method, staple, and the like, the number of sets of copies to be printed, a paper source, and the like for a print job, data of which has been spooled, after the test print process.

However, in such print system, whether or not the test print function or the setup change function after the test print process is available depends on the software environment (e.g., whether or not the printing apparatus supports the test print function), and the hardware environment of the printing apparatus such as the presence/absence of a hard disk for spooling data, the memory size, and the like.

After the test print process, the number of sets of copies, finishing function, and paper source can be changed. However, since the spooled data is raster data, setup changes that require to re-render the raster data itself, e.g., a change in output appearance of, e.g., an N-up print mode, a change in additional information such as a watermark or the like, cannot be made. Note that the N-up print function lays out and prints images for N pages created by, e.g., an application on one surface of a single sheet by reducing them as needed.

After the test print process, if the user proceeds with the print process without changing any setups, he or she obtains print results more than the number of sets of copies he or she wants to obtain by the number of test prints.

SUMMARY OF THE INVENTION

The present invention has been made in consideration of the aforementioned prior art, and has as its object to provide a print control method and apparatus, and a print system, which can implement a test print function for executing a test print process of a generated print job independently of the functions of a printing apparatus.

It is another object of the present invention to provide a print control method and apparatus, and a print system, which can change print setups that include re-generation of raster data.

It is still another object of the present invention to provide a print control method and apparatus, and a print system, which can prevent expendables such as print media and the like from being wasted by the test print process.

In order to achieve the above objects, the present invention comprises the following arrangement. That is, a print control method for controlling a printing apparatus to print, comprises:

a saving step of saving data to be printed in a storage unit together with the designated number of sets of copies;

a discrimination step of discriminating if a print instruction is a test print instruction;

a change step of changing the number of sets of copies to 1 when the print instruction is the test print instruction; and an output step of outputting the data saved in the storage unit to the printing apparatus together with the number of sets of copies in response to the print instruction.

More preferably, the method further comprises a delete step of deleting the data output in the output step from the storage unit when the print instruction is not the test print instruction.

More preferably, the method further comprises a step of decreasing the number of sets of copies output in a test print process from the designated number of sets of copies, when the print instruction is the test print instruction.

More preferably, the data stored in the storage unit is intermediate data before being converted into a format to be output to the printing apparatus, and the method further comprises a change step of changing a setup associated with the data saved in the storage unit after the data is output in the output step, when the print instruction is the test print instruction.

More preferably, the method further comprises a change step of changing a setup associated with the data saved in the storage unit after the data is output in the output step, when the print instruction is the test print instruction, and a step of resetting the designated number of sets of copies to an original value when the setup has been changed in the change step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

Figure 1:
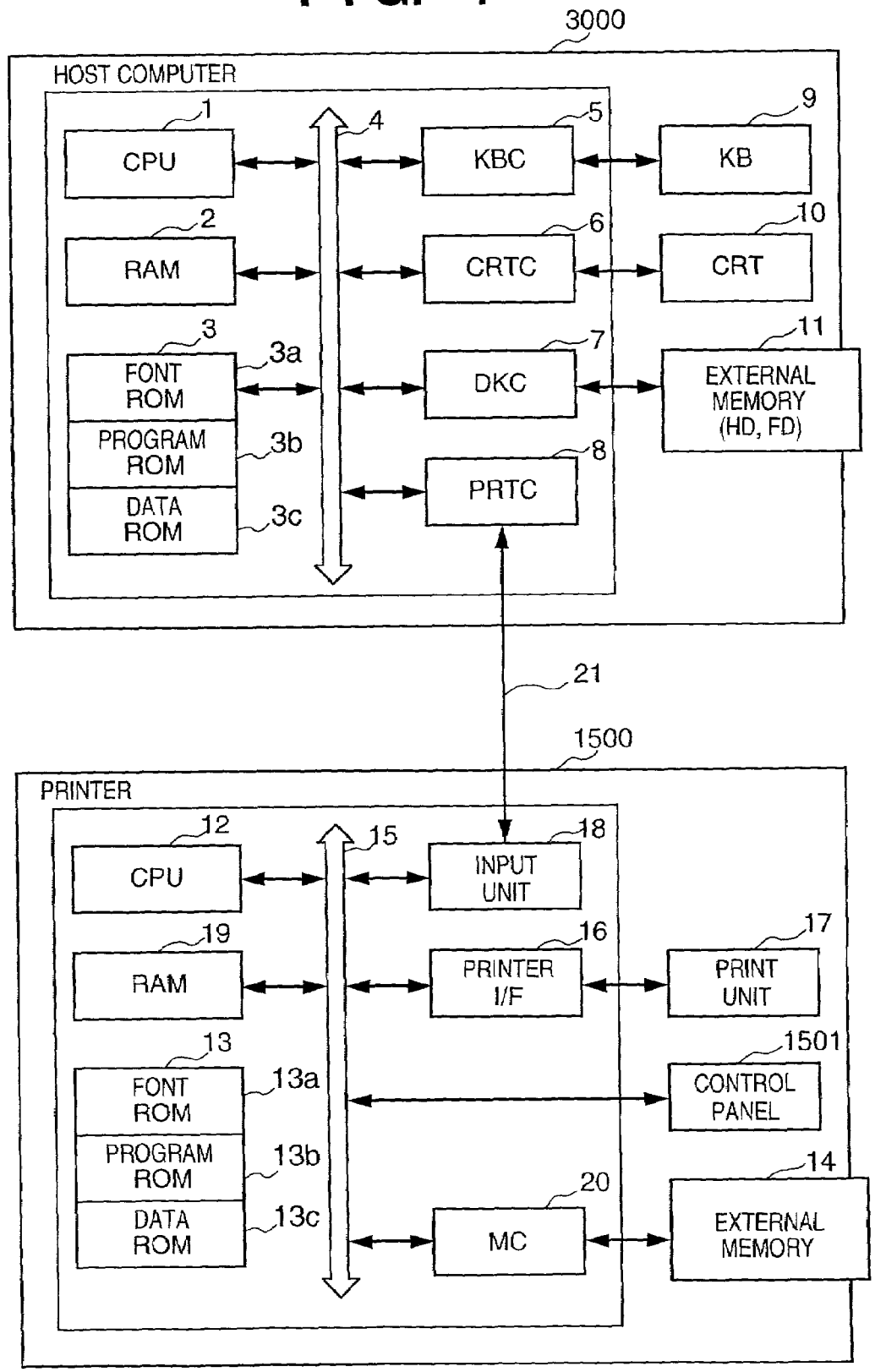
FIG. 1 is a block diagram for explaining the arrangement of a print control apparatus according to an embodiment of the present invention.

A preferred embodiment of the present invention will be described hereinafter with reference to the accompanying drawings.

The arrangement of a printer control system according to this embodiment will be explained first with reference to the block diagram of FIG. 1. Note that the present invention can be applied to any of a standalone apparatus, a system consisting of a plurality of apparatuses, and a system which is connected via a network such as a LAN (Local Area Network), WAN (Wide Area Network), or the like to execute processes, as long as the functions of the present invention are implemented.

A print control system according to this embodiment comprises a host computer 3000 and a printer 1500. The host computer 3000 comprises a CPU 1, RAM 2, ROM 3, keyboard controller (KBC) 5, CRT controller (CRTC) 6, disk controller (DKC) 7, printer controller (PRTC) 8, keyboard (KB) 9, CRT display (CRT) 10, and external memory 11.

The arrangements of the respective units of the host computer 3000 will be explained in detail below. The CPU 1 is a central processing unit for systematically controlling devices connected to a system bus, and executes a document process including figures, images, characters, tables (including a spreadsheet or the like), and the like on the basis of a document processing program stored in a program ROM 3b (to be described later) of the ROM 3 or in the external memory 11. The CPU 1 rasterizes outline fonts onto a display information RAM assured on, e.g., the RAM 2 to realize WYSIWYG (What You See Is What You Get: a function that can print images as they appear on the CRT display screen when printed) on the CRT display 10.

Furthermore, the CPU 1 opens various registered windows on the basis of commands instructed by a mouse cursor (not shown) or the like on the CRT 10, and executes various data processes. The user can set a print processing method for a printer driver including the setup of the printer 1500 and print mode selection by opening a window that pertains to the print setups upon executing a print process using the printer 1500.

The RAM 2 serves as a main memory, work area, and the like of the CPU 1. The ROM 3 comprises a font ROM 3a, the program ROM 3b, and a data ROM 3c. The font ROM 3a or external memory 11 stores font data and the like used in the document process. The program ROM 3b or external memory 11 stores an operating system (to be referred to as an OS hereinafter) as a control program of the CPU 1. The data ROM 3c or external memory 11 stores various data used upon executing the document process or the like.

The keyboard controller (KBC) 5 controls key input from the keyboard 9 and a pointing device (not shown). The CRT controller (CRTC) 6 controls display of the CRT display (CRT) 10. The disk controller (DKC) 7 controls access to the external memory 11. The printer controller (PRTC) 8 is connected to the printer 1500 via a two-way interface 21 and executes a communication control process with the printer 1500. The keyboard 9 has various keys.

The CRT display (CRT) 10 displays figures, image characters, tables, and the like. The external memory 11 comprises a hard disk (HD), floppy disk (FD), and the like, and stores a boot program, various applications, font data, user files, edit files, a printer control command generation program (to be referred to as a printer driver hereinafter), and the like.

The CPU 1, RAM 2, ROM 3, keyboard controller (KBC) 5, CRT controller (CRTC) 6, disk controller (DKC) 7, and printer controller (PRTC) 8 are disposed on a computer control unit 2000.

The arrangements of the respective units of the printer 1500 will be explained below. A CPU 12 is a central processing unit that systematically controls respective devices connected to a system bus 15, and outputs an image signal as output information to a print unit (printer engine) 17 on the basis of a control program and the like stored in a program ROM 13b (to be described later) of a ROM 13 or in an external memory 14. The CPU 12 can communicate with the host computer 3000 via an input unit 18, and can inform the host computer 3000 of information and the like in the printer 1500.

A RAM 19 serves as a main memory, work area, and the like of the CPU 12, and can expand its memory size using an option RAM (not shown) connected to an expansion port. Note that the RAM 19 is used as an output information rasterizing area, environment data storage area, NVRAM, and the like. The ROM 13 comprises a font ROM 13a, the program ROM 13b, and a data ROM 13c. The font ROM 13a stores font data and the like used upon generating the output information. The program ROM 13b stores a control program and the like of the CPU 12. The data ROM 13c stores information and the like used on the host computer 3000 when no external memory 14 such as a hard disk or the like is connected to the printer 1500.

The input unit 18 exchanges data between the printer 1500 and host computer 3000 via the two-way interface 21. A print unit interface (I/F) 16 exchanges data between the CPU 12 and print unit 17. A memory controller (MC) 20 controls access to the external memory 14. The print unit 17 prints under the control of the CPU 12. A control panel 1501 has various operation switches, display means (LED indicators), and the like.

The external memory 14 comprises a hard disk (HD), IC card, or the like, and is connected as an option to the printer 1500. The external memory 14 stores font data, an emulation program, form data, and the like, and the memory controller (MC) 20 controls access to the external memory 14. Note that the number of external memories 14 is not limited to one, but a plurality of external memories can be connected. That is, a plurality of option font cards in addition to built-in fonts and external memories that store programs for interpreting printer control languages of different language systems may be connected. Furthermore, an NVRAM (not shown) may be connected, and may store printer mode setup information from the control panel 1501.

The aforementioned CPU 12, RAM 19, ROM 13, input unit 18, print unit interface (I/F) 16, and memory controller (MC) 20 are disposed on a printer control unit 1000.

Figure 2:
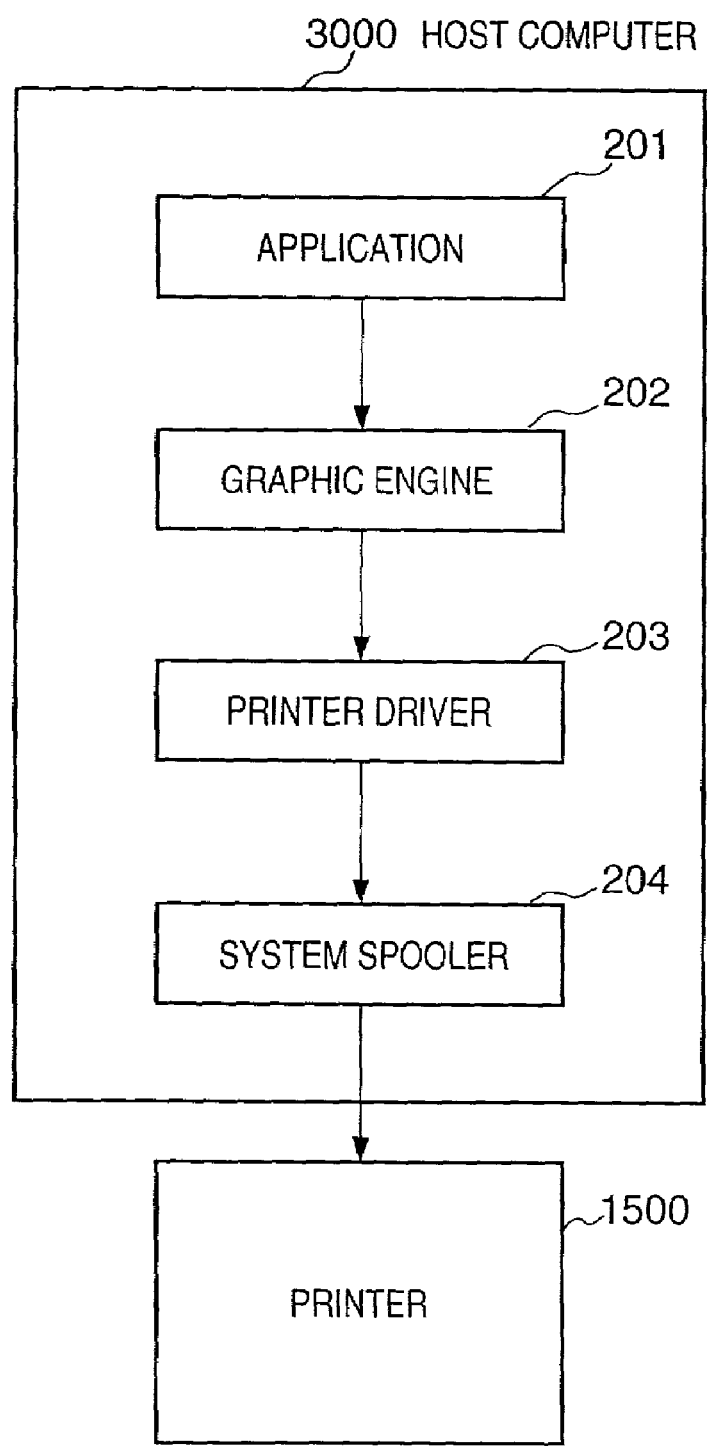
FIG. 2 is a block diagram showing the arrangement of a typical print system in which a printer is connected to a host computer.

FIG. 2 is a block diagram showing the configuration of a typical print process in the host computer to which a printing apparatus such as a printer or the like is connected directly or via a network. Referring to FIG. 2, an application 201, graphic engine 202, printer driver 203, and system spooler 204 are program modules which are stored as files in the external memory 11 in FIG. 1, and are loaded onto the RAM 2 by the OS or a module that uses the corresponding module upon execution.

The application 201 and printer driver 203 can be added to the HD in the external memory 11 using the FD in the external memory 11 or a CD-ROM (not shown), or via a network (not shown). The application 201 stored in the external memory 11 is loaded onto the RAM 2 upon execution. When the application 201 executes a print process with respect to the printer 1500, it outputs (renders) data using the graphic engine 202 which is similarly loaded onto the RAM 2 upon execution.

The graphic engine 202 loads a printer driver 203 which is prepared for each printing apparatus from the external memory 11 onto the RAM 2, and sets the output from the application 201 in the printer driver 203. The graphic engine 202 then converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command, e.g., PDL (Page Description Language) that the printer can recognize. The converted printer control command is output as print data to the printer 1500 via the interface 21 by the system spooler 204 which is loaded onto the RAM 2 by the OS.

Figure 3:
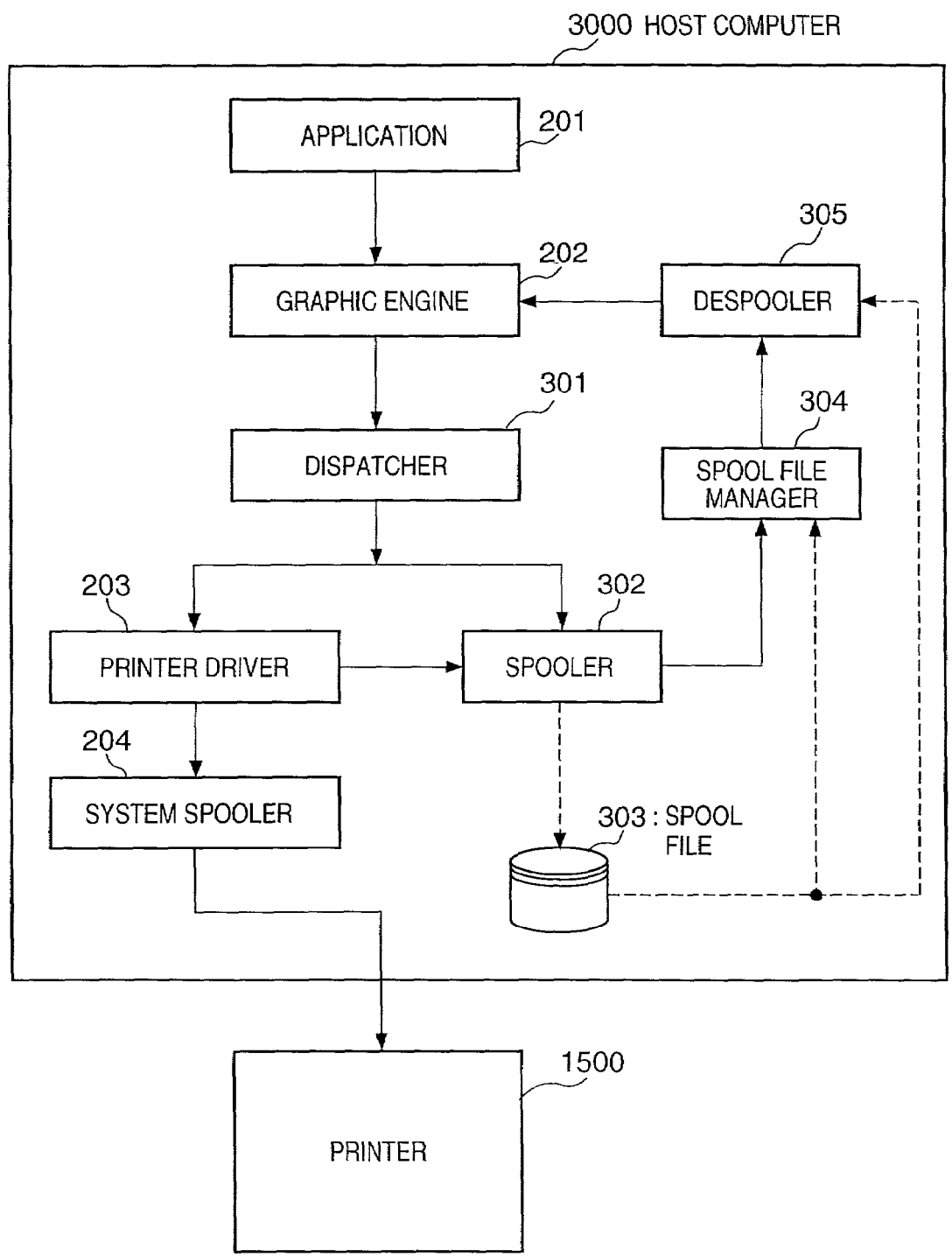
FIG. 3 is a block diagram showing the arrangement of a print system which temporarily spools a print command from an application into an intermediate code before converting it into a printer control command.
Figure 4:
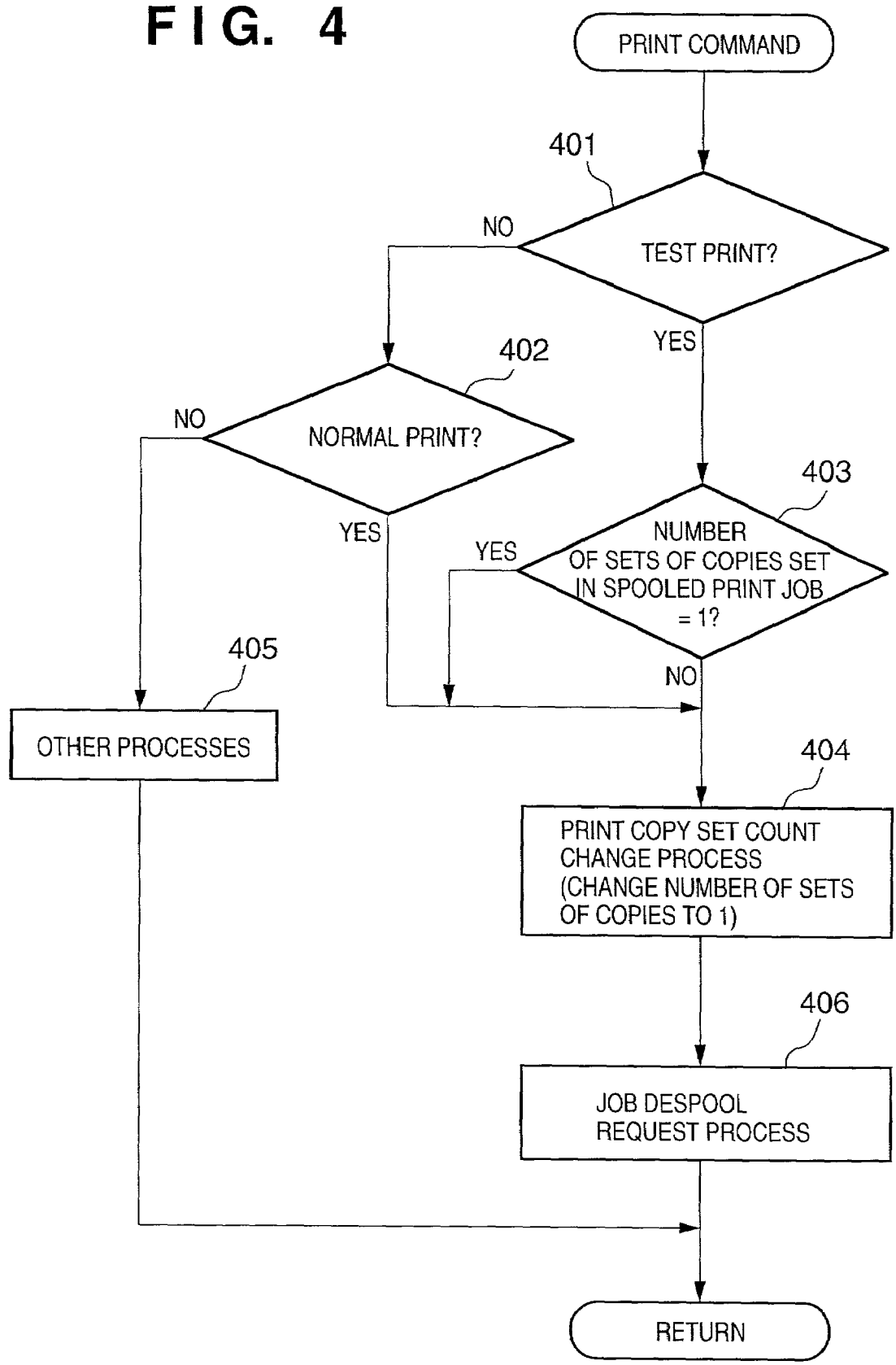
FIG. 4 is a flow chart as a characteristic feature of the processing sequence of the present invention.
Figure 5:
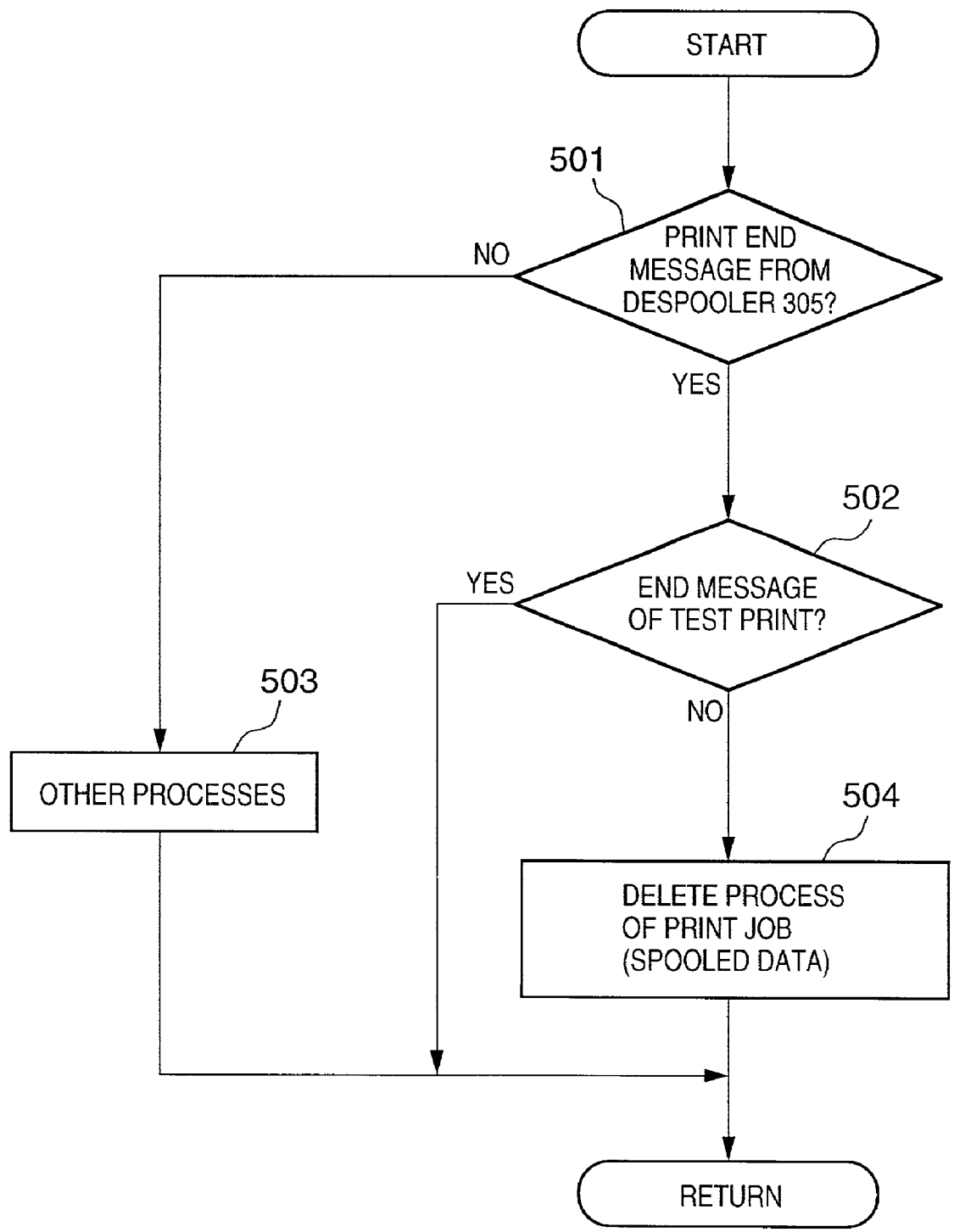
FIG. 5 is a flow chart as a characteristic feature of the processing sequence of the present invention.
Figure 6:
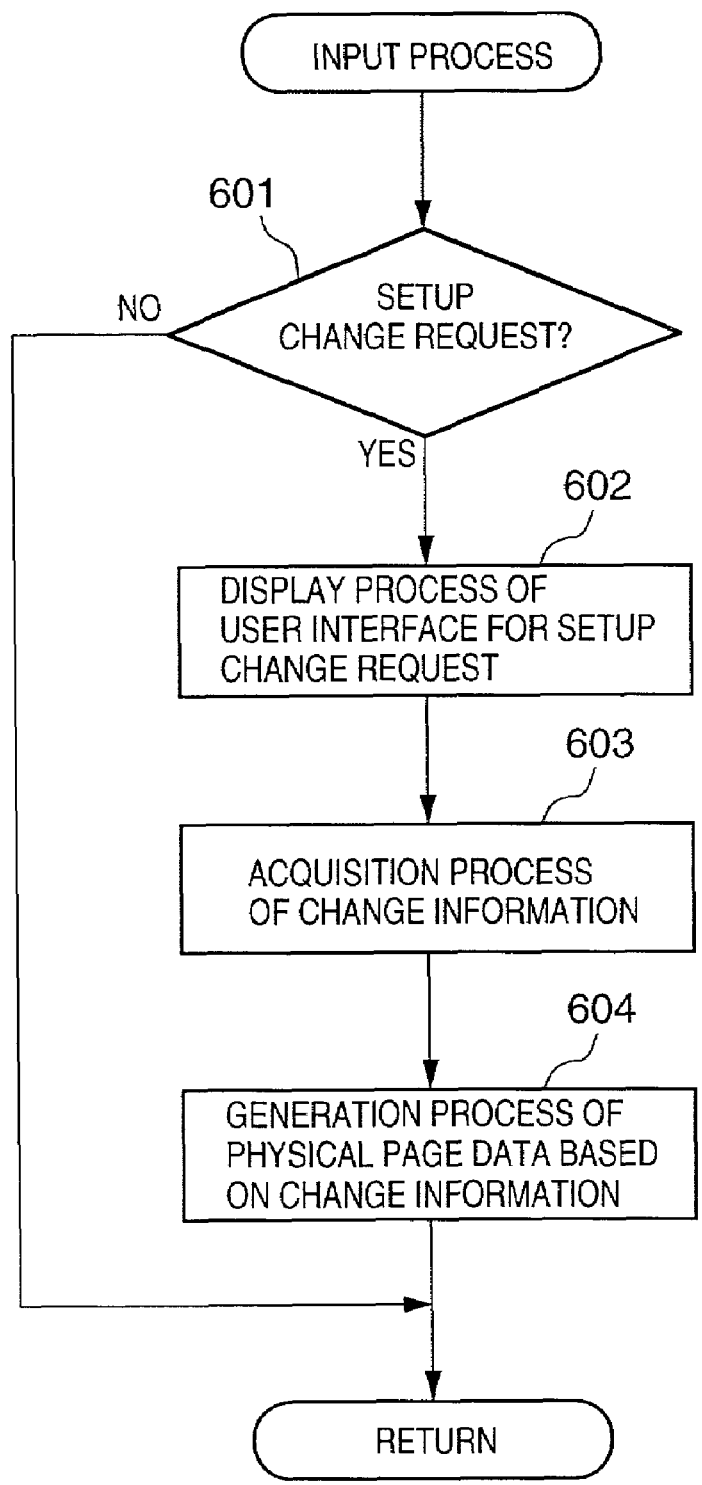
FIG. 6 is a flow chart as a characteristic feature of the processing sequence of the present invention.

The printer control system according to the first embodiment also has an arrangement for temporarily spooling print data from the application as intermediate codes, as shown in FIG. 3, in addition to the print system constructed by the printer 1500 and host computer 3000 shown in FIGS. 1 and 2.

FIG. 3 shows the expanded system of FIG. 2. This system temporarily generates a spool file 303 consisting of intermediate codes upon sending a print command from the graphic engine 202 to the printer driver 203. In the system shown in FIG. 2, the application 201 is released from the print process when the printer driver 203 has converted all print commands from the graphic engine 202 into printer control commands.

By contrast, in the system shown in FIG. 3, the application 201 is released from the print process when a spooler 302 converts all print commands into intermediate code data, and outputs print commands to the spool file 303. Normally, the latter system can shorten the processing time. In the system shown in FIG. 3, data as the contents of the spool file 303 can be processed. In this way, functions such as enlargement/reduction, N-up print of a plurality of pages on one page, and the like that the application does not have can be implemented for print data from the application.

For these purposes, the system of this embodiment is attained by expanding the system shown in FIG. 2 to spool data as intermediate codes, as shown in FIG. 3. In order to process print data, setups are normally made from a window provided by the printer driver 203, which saves the setup contents on the RAM 2 or external memory 11.

The arrangement in FIG. 3 will be explained in detail below. As shown in FIG. 3, in this expanded processing system, a dispatcher 301 receives a print command from the graphic engine 202. When the print command that the dispatcher 301 receives from the graphic engine 202 is based on a print command issued from the application 201 to the graphic engine 202, the dispatcher 301 loads the spooler 302 stored in the external memory 11 onto the RAM 2, and sends the print command to the spooler 302 in place of the printer driver 203.

The spooler 302 converts the received print command into intermediate codes and outputs the converted codes to the spool file 303. The spooler 302 acquires processing setups associated with print data set in the printer driver 203 from the printer driver 203, and saves them in the spool file 303. The processing setups include the number of sets of copies to be printed. Note that the spool file 303 is generated as a file on the external memory 11 but may be generated on the RAM 2. Furthermore, the spooler 302 loads a spool file manager 304 stored in the external memory 11 onto the RAM 2, and informs the spool file manager 304 of the generation state of the spool file 303.

After that, the spool file manager 304 checks if a print process can be done in accordance with the contents of the processing setups associated with print data, which are saved in the spool file 303. If the spool file manager 304 determines that the print process can be done using the graphic engine 202, it loads a despooler 305 stored in the external memory 11 onto the RAM 2, and instructs the despooler 305 to execute the print process of intermediate codes described in the spool file 303.

The despooler 305 processes the page intermediate codes included in the spool file 303 in accordance with the contents of the processing setups included in the spool file 303, and outputs them via the graphic engine 202 once again. When the print command that the dispatcher 301 receives from the graphic engine 202 is based on a print command issued from the despooler 305 to the graphic engine 202, the dispatcher 301 sends the print command to the printer driver 203 in place of the spooler 302. The printer driver 203 generates a printer control command, and outputs it to the printer 1500 via the system spooler 204.

Figure 7:
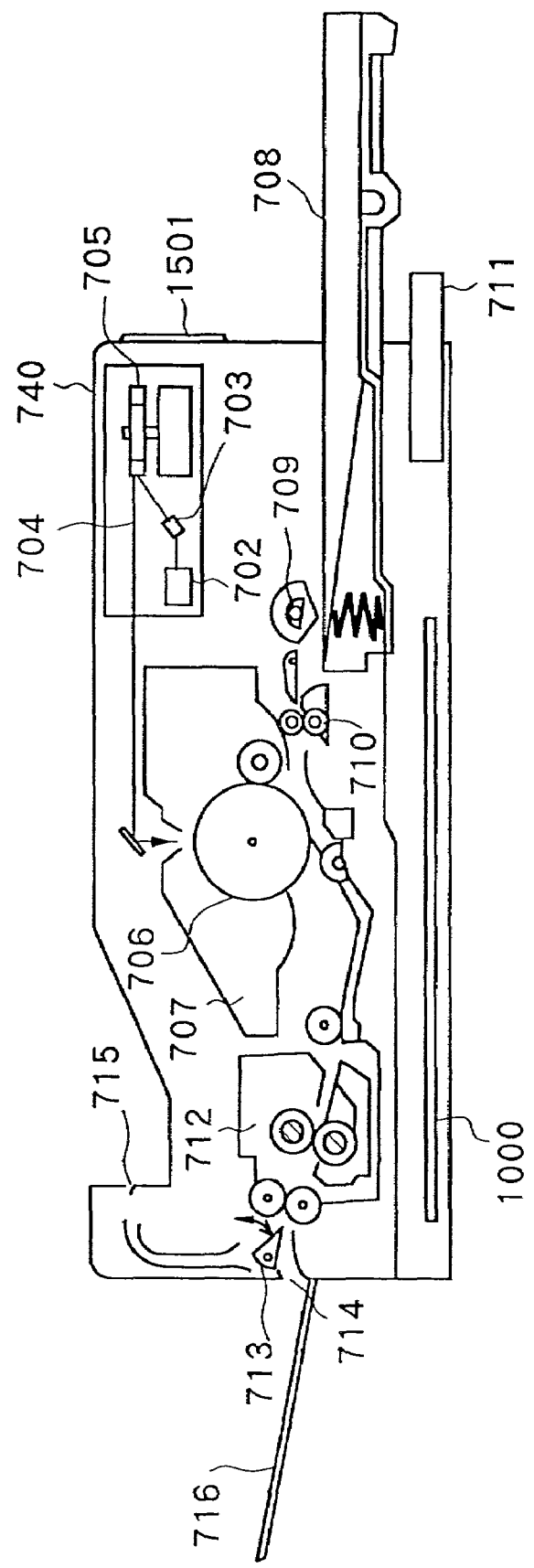
FIG. 7 is a sectional view showing the internal structure of a laser beam printer.

FIG. 7 is a sectional view showing the internal structure of a laser beam printer (to be abbreviated as an LBP hereinafter) as an example of the printer 1500 according to the first embodiment.

The printer 1500 as an LBP can receive character pattern data and the like and can print them on a recording sheet.

The printer 1500 comprises, in an LBP main body 740 that forms an image on a recording sheet as a print medium on the basis of a supplied printer control command and the like, the printer control unit 1000, the control panel 1501, a laser driver 702, a semiconductor laser 703, a rotary polygonal mirror 705, an electrostatic drum 706, a developing unit 707, a paper cassette 708, convey rollers 710, an external memory 711, a face-down exhaust unit 715, and an exhaust tray 716.

The arrangements of the respective units will be explained in detail below together with their operations. The printer control unit 1000 controls the entire LBP main body 740, and interprets character pattern information and the like. That is, the unit 1000 mainly converts a printer control command into a video signal, and outputs the video signal to the laser driver 702. An external memory 711 that supplies font data, an emulation program of a page description language, and the like may be connected to the printer control unit 1000. The control panel 1501 has operation switches, display means (e.g., LED indicators), and the like, as described above.

The laser driver 702 is a circuit for driving the semiconductor laser 703, and turns on/off a laser beam 704 emitted by the semiconductor laser 703 in accordance with an input video signal. The semiconductor laser 703 emits a laser beam toward the rotary polygonal mirror 705. The rotary polygonal mirror 705 scans the laser beam 704 on the surface of the electrostatic drum 706 in the right-and-left direction. Upon scanning the laser beam 704, an electrostatic latent image of a character pattern is formed on the drum surface.

The developing unit 707 is arranged around the electrostatic drum 706, and develops an electrostatic latent image. The developed image is transferred onto a recording sheet. The paper cassette 708 stores cut sheets as a recording sheet. A pickup roller 709 and the convey rollers 710 feed a cut recording sheet in the paper cassette 708 into the LBP main body 740 and supply it to the electrostatic drum 706. In this case, a cut recording sheet can be fed from a manual insert tray (not shown) provided on the upper surface of a lid portion of the paper cassette 708.

A fixing unit 712 heats a toner image transferred onto a cut recording sheet, and fixes it. The recording sheet on which the image is formed is exhausted from a face-up exhaust unit 714 onto the exhaust tray 716 with its recorded surface facing up when a selector wedge 713 is set upward; or is exhausted from the face-down exhaust unit 715 with its recorded surface facing down when the wedge 713 is set downward.

<Process by Spool File Manager>

FIGS. 4, 5, 6, 8, and 10 show a generic processing flow of a test print processing method of the present invention in the spool file manager 304. An outline of the present invention will be explained below using these figures.

Figure 9:
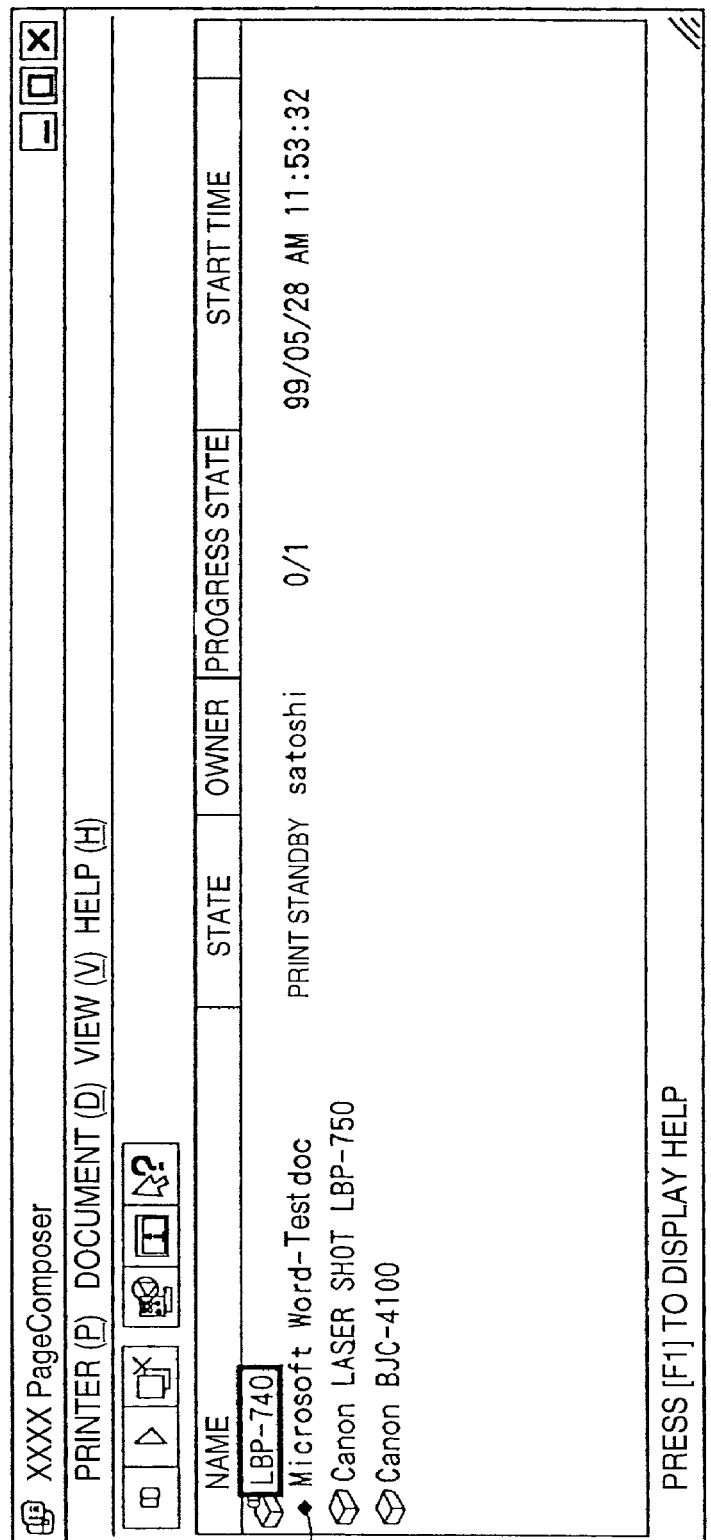
FIG. 9 is a view showing an example of a spool file manager in the present invention.

FIG. 9 shows an example of a spooled job spooled by the spool file manager 304 that spools intermediate codes. In FIG. 9, a print job 901 is spooled, and is held in a print standby state. In order to set this paused state (print standby state), the user may press a pause button on the user interface of the spool file manager 304 or may select an attribute such as "store print data" from the interface of the printer driver, but the method is not particularly limited. When "store" is designated, that information is stored in the spool file 303, and the spool file manager 304 is automatically set in the print standby state. After that, the user can select print, test print, or the like from the user interface of the spool file manager 304.

When "store print data" is selected, print data is converted into intermediate data, which is held as a spool file. The intermediate data is held until execution of a print process is instructed and the print process is successfully done or until deletion is instructed. Execution of the print process starts when the user selects a job in the print standby state from FIG. 9 and designates a "print" command from a menu with respect to the selected job.

<Process of Print Command>

When a command that pertains to a print process arrives at the spool file manager upon selection of the user, a discrimination process 401 (FIG. 4) for checking if a test print process is selected is done. That is, the type of print command is discriminated. If it is determined that the test print process is selected, a discrimination process 403 for checking if the setup of the number of sets of copies included in the spooled print job is 1. In this process, it is checked if the number of sets of copies that the user wanted on the application is 1. In the test print process, even when the spool file 303 includes a setup indicating a plurality of sets of copies, the plurality of sets of copies need not be printed. For this reason, if the number of sets of copies that the user originally set is 1, the print process can start. However, if a plurality of sets of copies are set, the number of sets of copies must be re-set to 1 before the print process starts. Discrimination for this purpose is made in this process.

If the number of sets of copies is not 1, i.e., if a plurality of sets of copies are set, the next print copy set count change process 404 is done. In this process, the print setup is changed to indicate the number of sets of copies=1 irrespective of the original print setup. Based on the number of sets of copies to be printed changed in this process, the next job despool request process 406 is executed, and the despooler 305 executes a despool process. The process by the despooler 305 is the same process executed when it is determined in step 401 that no test print process is selected, and it is determined in step 402 that a normal print process is selected. Note that the normal print process after the test print process starts after the number of sets of copies to be printed is reset to the originally set value.

After the job despool request process 406, the spool file manager 304 receives a message of the print state from the despooler 305. Upon receiving this message, a discrimination process 501 in FIG. 5 for checking if the message is a print end message from the despooler is done. With this process, it is determined if the despool process is complete, i.e., the print process is complete.

If it is determined that the message is a print end message, a discrimination process 502 for checking if the job of interest corresponds to a test print process is executed. In this process, it is checked if the job for which the end message was received corresponds to a test or normal print process. If it is determined that the job does not correspond to a test print process, a print job delete process 504 is executed. This process is an end process for deleting the spool file 303 and so forth upon completion of the print process. In this manner, information that pertains to spool data of the job, the print process of which is complete, is deleted. As a result, the job 901 disappears from display on the user interface shown in FIG. 9.

If the job corresponds to a test print process, since neither the spool file 303 nor information pertaining to the job are deleted, the print job delete process 504 is skipped.

With a series of operations, the test print process on the host computer side is implemented.

<Setup Change After Test Print>

Print setups may be changed after the test print process.

In this process, a user interface used to change setups is launched from the spool file manager 304 shown in FIG. 9 in response to user's operation, and the print setups of the already spooled job are changed. The process will be explained below using FIG. 6.

As a result of the test print process, if the user wants to change its print setups for some reasons, he or she operates the spool file manager 304 to issue a setup change request. Assume that this request is prepared in advance on the user interface of the spool file manager 304 in the form of a button or the like.

For this reason, if the user makes an input via a UI (FIG. 9 or the like), a discrimination process 601 for checking if that input is a setup change request is executed.

If the spool file manager 304 determines that the input is a setup change request, a setup change user interface display process 602 is executed. This user interface is used to prompt the user to change print setups in practice, and may be uniquely prepared by a spool file system or may use that of the printer driver. The user changes print setups to those he or she wants using this user interface. For example, a setup of N-up print, addition of a watermark, and the like may be changed. After that, the changed contents are acquired by a change information acquisition process 603, and a physical page data generation process 604 based on the change information is executed. Physical page data is data of each page used upon executing the despool process of the despooler 305, and corresponds to one surface of a sheet as a print medium. If the print setups have been changed, the physical page data must be re-generated in this process.

For example, when the designated contents of N-up print are to be changed, pages created by an application must be laid out again on a physical page. For this reason, when bitmap data have been spooled, the designated contents cannot be changed using the bitmap data. However, in the system of this embodiment, since intermediate data are spooled, the setups of the spooled print job can be changed by changing parameters of N-up print and re-generating bitmap data. The same applies to other setup items.

As described above, the process transits to the despooler 305, and a print process can be done based on the changed print setups.

In this manner, since the host computer spools intermediate data, a test print process of the spooled job can be executed irrespective of the functions of the printing apparatus.

Since intermediate data are held, the degree of freedom in setup changes associated with already spooled data can be improved.

Second Embodiment

In the second embodiment, the number of sets of copies to be printed after the test print process is automatically decremented, and when the user is satisfied with the test print result, these printouts are counted as a part of the number of sets of copies to be printed, thus minimizing consumption of expendables.

Figure 8:
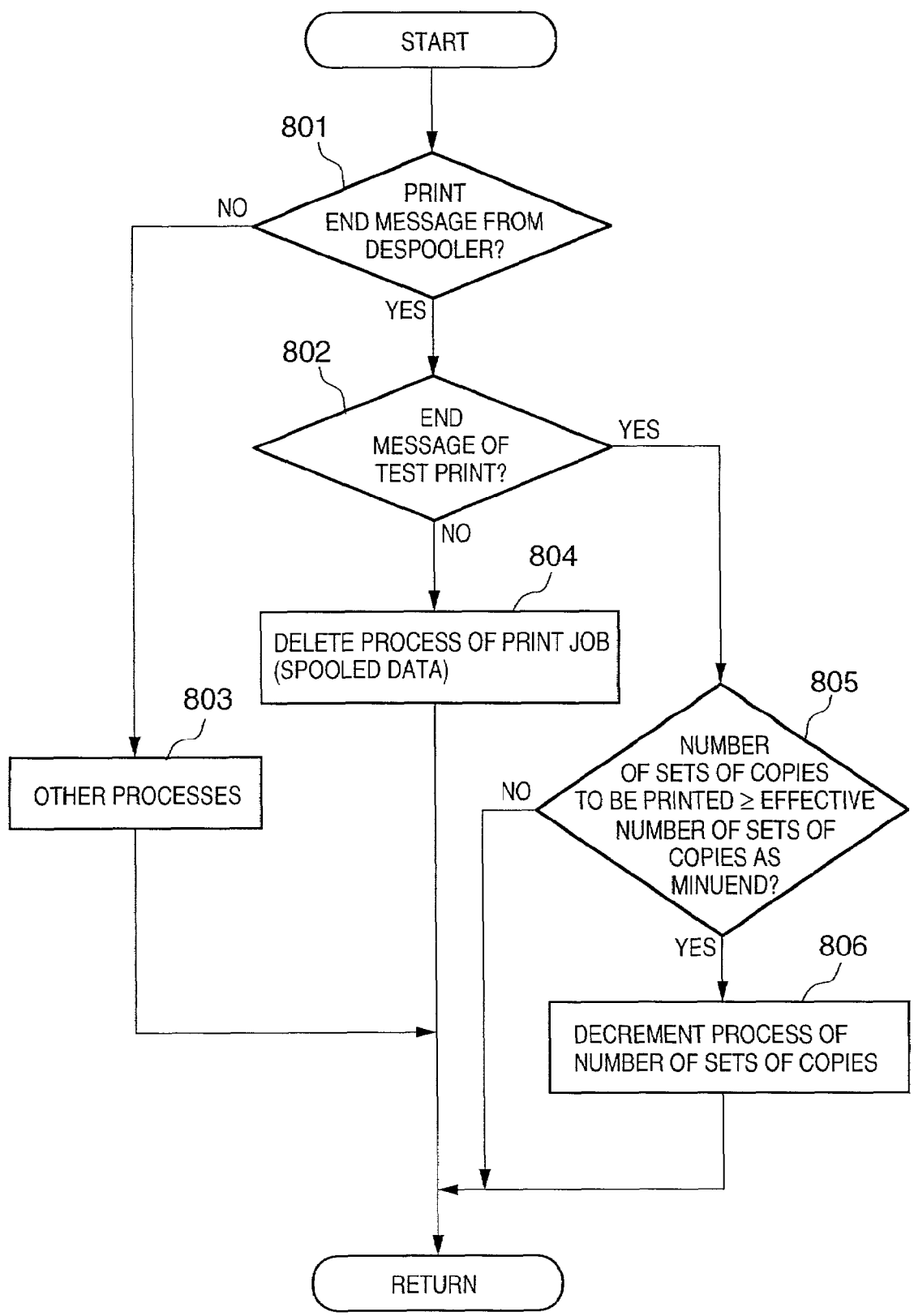
FIG. 8 is a flow chart as a characteristic feature of the processing sequence of the present invention.

This process will be explained below using FIG. 8. FIG. 8 shows the processing sequence executed in place of FIG. 5 of the first embodiment, in this embodiment. Note that the processing sequence executed upon receiving a print sequence is the same as that shown in FIG. 4 of the first embodiment.

Referring to FIG. 8, after the job despool request process 406, the spool file manager 304 receives a message of the print state from the despooler 305. Upon receiving this message, a discrimination process 801 for checking if that message is a print end message from the despooler is executed. With this process, it is determined if the despool process is complete, i.e., the print process is complete.

If it is determined that the message is a print end message, a discrimination process 802 for checking if the job of interest corresponds to a test print process is executed. In this process, it is checked if the job for which the end message was received corresponds to a test or normal print process. If it is determined that the job does not correspond to a test print process, a print job delete process 804 is executed. This process is an end process for deleting the spool file 303 and so forth upon completion of the print process. In this manner, information that pertains to spool data of the job, the print process of which is complete, is deleted. As a result, the job disappears from display on the user interface shown in FIG. 9.

On the other hand, if the job corresponds to a test print process, since neither the spool file 303 nor information pertaining to the job are deleted, the print job delete process 804 is skipped.

If it is determined that the job corresponds to a test print process, a discrimination process 805 for checking if the number of sets of copies to be printed is equal to or larger than the effective number of sets of copies as a minuend. The effective number of sets of copies as a minuend is a constant used as a limit value to which the number of sets of copies to be printed is decremented. If it is determined that the number of sets of copies to be printed is equal to or larger than the effective number of sets of copies as a minuend, a copy set count decrement process 806 is done. In this process, the set number of sets of copies to be printed is decremented by 1.

For example, if the effective number of sets of copies as a minuend is 2, and the number of sets of copies to be printed is 2, "the number of sets of copies to be printed $\geqq$ the effective number of sets of copies as a minuend" is determined in step 805 after the test print process. For this reason, the number of sets of copies is decremented by 1 in step 806, and the remaining number of sets of copies becomes 1. That is, upon executing an actual print process, the number of sets of copies is automatically set to be 1. When the second print process has been done, since the number of sets of copies has already become 1 after the first test print process, this value is smaller than 2 as the effective number of sets of copies as a minuend. For this reason, the copy set count decrement process 806 is skipped in this case, and one set of copies are output when the actual print process is done later. When one set of copies obtained by the latest test print process are to be counted as the effective number of sets of copies, the effective number of sets of copies as a minuend and the number of sets of copies to be printed can be set to be the same value.

Figure 10:
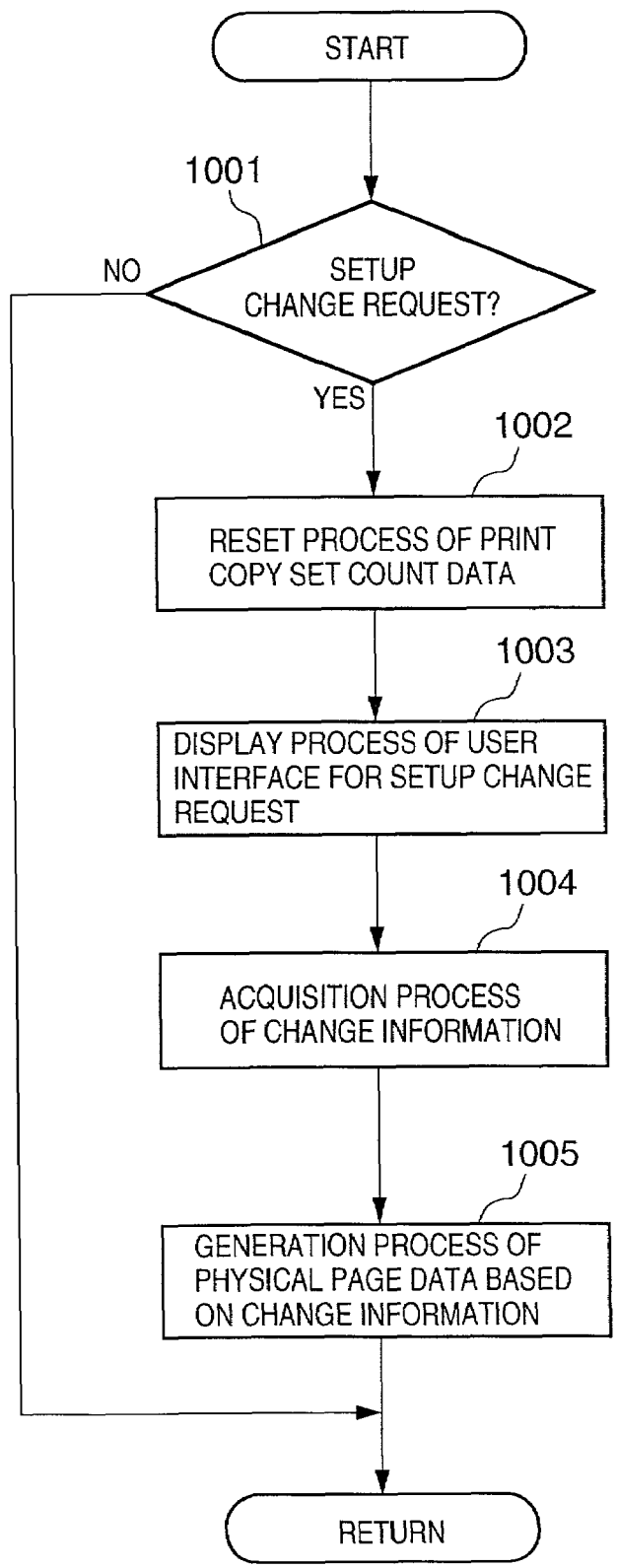
FIG. 10 is a flow chart as a characteristic feature of the processing sequence of the present invention.

As described above, when print setups are changed after the test print process, the decremented number of sets of copies to be printed must be reset to an initial value. FIG. 10 shows this flow.

A discrimination process 1001 for checking if a setup change request is detected is done. When the user wants to change print setups for some reasons after the test print process, he or she issues a setup change request by operating the spool file manager 304. Assume that this request is prepared in advance on the user interface of the spool file manager 304 in the form of a button or the like as in the above embodiment. If the spool file manager 304 determines that a setup change request is detected, a reset process 1002 of print copy set count data is done. With this process, the number of sets of copies to be printed which has been decremented after the test print process is automatically reset to that which was designated initially. After that, print setups are changed in the same processes as those described above, and the despool process is done.

With a series of processes, the number of sets of copies to be printed after the test print process is automatically decremented, and when setups are changed, the number of sets of copies to be printed is reset to an initial value.

With the aforementioned sequence, if the user is satisfied with a set of printouts of the test print process, an actual print process prints sets of copies, the number of which is obtained by excluding the set obtained in the test print process. In this manner, paper sheets, ink, and toner can be prevented from being wasted. When setups are changed, printouts corresponding to the designated number of sets of copies can be obtained after the setup change.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records program codes of software of the sequences shown in FIGS. 4 to 6, 8, and 10 that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the print system of this embodiment, a test print function that executes a test print process of the generated print job irrespective of functions of a printing apparatus can be implemented.

After the test print process, print setups that include re-generation of raster data can be changed.

Also, expendables can be prevented from being wasted by the test print process.

As many apparently widely different embodiments of the present invention can be made without departing from the spirit and scope thereof, it is to be understood that the invention is not limited to the specific embodiments thereof except as defined in the appended claims.

What is claimed is:

1. A print control apparatus as a host computer which is connected to an external printing apparatus through an interface and executes a printer driver which generates print data described in the page description language to be interpreted by the external printing apparatus, comprising:
   a spooler that saves intermediate data to be converted into the print data, together with a first number of copies designated to be used for printing the print data in accordance with a print instruction from an application;
   a changing unit that checks if a print instruction is a test print instruction, that changes the first number of copies to a second number of copies for the test print;
   a generating unit that generates the print data with the printer driver based on the intermediate data and the second number of copies for the test print changed by said changing unit; and
   a transmitting unit that transmits the print data generated by said generating unit to the printing apparatus;
   a receiving unit that receives a setup change instruction using a setting screen of the printer driver after the print data for the test print is transmitted by said transmission unit, wherein the setup change instruction is instruction that instructs the printer to print an image different from the image printed on a printing paper by the test print; and
   a generating control unit that changes the second number of copies for the test print to the first number of copies without an instruction from a user when the setup change instruction has been received, and instructs the printer driver to generate the print data to be used for printing after the test print using the first number copies, the intermediate data spooled by said spooler and a setup changed based on the setup change instruction.

2. The apparatus according to claim 1, wherein when the print instruction is not the test print instruction, said spool file manager deletes the output data from said spooler.

3. The apparatus according to claim 1, wherein when the print instruction is the test print instruction, said generation unit generates the print data with a number of copies having a value obtained by subtracting the number of copies output in a test print process from the designated number of copies after said spool file manager outputs the data.

4. The apparatus according to claim 1,
   wherein the intermediate data stored in said spooler is data before being converted into a format to be output to the printing apparatus, and when the print instruction is the test print instruction, said spool file manager changes a setup related to a content to be printed associated with the intermediate data saved in said spooler after said spool file manager outputs the intermediate data, and
   wherein said generating unit reads the intermediate data saved in the spooler and generates print data based on the setup related to the content to be printed and the intermediate data with the printer driver when the setup related to the content to be printed has been changed.

5. The apparatus according to claim 4, wherein said spool file manager changes the number of copies associated with the data saved in said spooler after said spool file manager outputs the data when the print instruction is the test print instruction, and resets the number of copies to the designated number of copies when the print instruction is not the test print instruction and when the number of copies has been changed.

6. A print system which is constructed by connecting a print control apparatus of claim 1 and a printing apparatus and prints based on data output from output step of said print control apparatus.

7. A print control apparatus as a host computer which is connected to an external printing apparatus through an interface and executes a printer driver which generates print data described in the page description language to be interpreted by the external printing apparatus comprising:
   spooling means for saving intermediate data to be converted into the print data, together with a first number of copies designated to be used for printing the print data in accordance with a print instruction from an application;
   changing means for checking if a print instruction is a test print instruction, changing the first number of copies to a second number of copies for the test print when the test print is instructed;
   generating means for generating the print data with the printer driver based on the intermediate data and the number of copies for the test print changed by said changing means; and
   transmitting means that transmits the print data generated by said generating means to the printing apparatus;
   receiving means for receiving a setup change instruction using a setting screen of the printer driver after the print data for the test print is transmitted by said transmitting means, wherein the setup change instruction is instruction that instructs the printer to print an image different from the image printed on a printing paper by the test print; and
   a generating control step that changes the second number of copies for the test print to the first number of copies without an instruction from a user when the setup change instruction has been received, and instructs the printer driver to generate the print data to be used for printing after the test print using the first number of copies, the intermediate data spooled by said spooler and a setup changed based on the setup change instruction.

8. The apparatus according to claim 7, wherein when the print instruction is not the test print instruction, said spool file managing means deletes the output data from said spooling means.

9. The apparatus according to claim 7, wherein when the print instruction is the test print instruction, said generation means generates the print data with a number of copies having a value obtained by subtracting the number of copies output in a test print process from the designated number of copies after said spool file managing means outputs the data.

10. The apparatus according to claim 7, wherein the intermediate data stored in said spooling means is data before being convened into a format to be output to the printing apparatus, and when the print instruction is the test print instruction, said spool file managing means changes a setup related to a content to be printed associated with the intermediate data saved by said spooling means after said spool file managing means outputs the intermediate data, and
wherein said generating unit reads the intermediate data saved in the spooler and generates print data based on the setup related to the content to be printed and the intermediate data with the printer driver when the setup related to the content to be printed has been changed.

11. The apparatus according to claim 10, wherein said spool file managing means changes the number of copies associated with the data saved by said spooling means after said spool file managing means outputs the data when the print instruction is the test print instruction, and resets the number of copies to the designated number of copies when the print instruction is not the test print instruction and when the number of copies has been changed.

12. A print control method at a host computer which is connected to an external printing apparatus through an interface and executes a printer driver which generates print data described in the page description language to be interpreted by the external printing apparatus, comprising:
a saving step of saving intermediate data to be converted into the print data, together with a first number of copies designated to be used for printing the print data in accordance with a print instruction from an application;
a changing step of checking if a print instruction is a test print instruction, changing the first number of copies to a second number of copies for the test print when the test print is instructed;
a generating step of generating the print data with the printer driver based on the intermediate data and the second number of copies for the test print changed in said changing step; and
a transmission step that transmits the print data generated by said generating step to the printing apparatus;
a receiving step that receives a setup change instruction using a setting screen of the printer driver after the print data for the test print is transmitted in said transmission step, wherein the setup change instruction is instruction that instructs the printer to print an image different from the image printed on a printing paper by the test print; and
a generating control step that change sthe second number of copies for the test print to the first number of copies without an instruction from a user when the setup change instruction has been received, and instructs the printer driver to generate the print data to be used for printing after the test print using the first number of copies, the intermediate data spooled by said spooler and a setup changed based on the setup change instruction.

13. The method according to claim 12, wherein said spool file managing step further includes a step of deleting the output data from the spool file when the print instruction is not the test print instruction.

14. The method according to claim 12, wherein said generating step further includes a step of, when the print instruction is the test print instruction, generating the print data with a number of copies having a value obtained by subtracting the number of copies output in a test print process from the designated number of copies after the data is output in said spool file managing step.

15. The method according to claim 12, wherein the intermediate data stored in the spool file is data before being convened into a format to be output to the printing apparatus,
wherein said spool file managing step further includes a step of, when the print instruction is the test print instruction, changing a setup related to a content to be printed associated with the intermediate data saved in the spool file after the intermediate data is output in said spool file managing step, and
wherein said generating step includes a step of reading the intermediate data saved in the spooler and generating print data based on the setup related to the content to be printed and the intermediate data with the printer driver when the setup related to the content to be printed has been changed.

16. The method according to claim 15, wherein said spool file managing step further includes a step of changing the number of copies associated with the data saved in the spool file after outputting the data saved in the spool file together with the number of copies to be printed when the print instruction is the test print instruction, and a step of resetting the number of copies to the designated number of copies when the print instruction is not the test print instruction and when the number of copies has been changed.

17. A computer program embodied in a computer readable storage medium that is executable in a host computer which is connected to an external printing apparatus through an interface and executes a printer driver which generates print data described in the page description language to be interpreted by the external printing apparatus, comprising:
saving procedure code means for saving intermediate data to be converted into the print data together with a first number of copies designated to be used for printing the print data in accordance with a print instruction from an application;
changing procedure code means for checking if a print instruction is a test print instruction, changing the first number of copies to a second number of copies for the test print when the test print is instructed;
generating procedure code means for generating the print data with the printer driver based on the intermediate data and the second number of copies for the test print changed by said changing procedure code means; and
transmitting procedure code means for transmitting the print data generated by said generating procedure code means to the printing apparatus;
receiving procedure code means for receiving a setup change instruction using a setting screen of the printer driver after the print data for the test print is transmitted by said transmission procedure code means, wherein the setup change instruction is instruction that instructs the printer to print an image different from the image printed on a printing paper by the test print; and generating control procedure code means for changing the second number of copies for the test print to the first number of copies without an instruction from a user when the setup change instruction has been received, and instructs the printer driver to generate the print data to be used for printing after the test print using the first number of copies, the intermediate data spooled by said spooler and a setup changed based on the setup change instruction.

18. The program according to claim 17, wherein said spool file managing procedure code means further includes a step of deleting the output data from the spool file when the print instruction is not the test print instruction.

19. The program according to claim 17, wherein, when the print instruction is the test print instruction, said generating procedure code means further includes a step of generating the print data with a number of copies having a value obtained by subtracting the number of copies output in a test print process from the designated number of copies after the data saved in the spool file is output by said spool file managing procedure code means.

20. The method according to claim 17, wherein the intermediate data stored in the spool file is data before being converted into a format to be output to the printing apparatus, and wherein said spool file managing procedure code means further includes a step of, when the print instruction is the test print instruction, changing a setup related to a content to be printed associated with the intermediate data saved in the spool file after the intermediate data saved in the spool file is output by said spool file managing procedure code means, and wherein said generating procedure code means reads the intermediate data saved in the spooler and generates print data based on the setup related to the content to be printed and the intermediate data with the printer driver when the setup related to the content to be printed has been changed.

21. The program according to claim 16, wherein said spool file managing code means further includes a step of changing the number of copies associated with the data saved in the spool file after the data saved in the spool file is output when the print instruction is the test print instruction, and a step of resetting the number of copies to the designated number of copies when the print instruction is not the test print instruction and when the number of copies has been changed.

22. The apparatus according to claim 1, wherein said receiving unit receives a setup change instruction by which the number of pages is laid out on a face of a printing paper, the number of pages being different from the number of pages set for the test printing.

23. The apparatus according to claim 1, further comprising a determination unit configured to determine whether or not a request for changing setup after a test print is issued, wherein said receiving unit displays a user interface of the printer driver to receive the setup change instruction when the request for changing setup is determined to be issued.

24. The apparatus according to claim 7, wherein said receiving means receives a setup change instruction by which the number of pages is laid out on a face of a printing paper, the number of pages being different from the number of pages set for the test printing.

25. The apparatus according to claim 7, further comprising a determining means for determining whether or not a request for changing setup after a test print is issued, wherein said receiving means displays a user interface of the printer driver to receive the setup change instruction when the request for changing setup is determined to be issued.

26. The method according to claim 12, wherein said receiving step receives a setup change instruction by which the number of pages is laid out on a face of a printing paper, the number of pages being different from the number of pages set for the test printing.

27. The method according to claim 12, further comprising a determining step of determining whether or not a request for changing setup after a test print is issued, wherein said receiving step displays a user interface of the printer driver to receive the setup change instruction when the request for changing setup is determined to be issued.

28. The program according to claim 17, wherein said receiving procedure code means receives a setup change instruction by which the number of pages is laid out on a face of a printing paper, the number of pages being different from the number of pages set for the test printing.

29. The program according to claim 17, further comprising a determining procedure code means for determining whether or not a request for changing setup after a test print is issued, wherein said receiving procedure code means displays a user interface of the printer driver to receive the setup change instruction when the request for changing setup is determined to be issued.

* * * * *

UNITED STATES PATENT AND TRADEMARK OFFICE
CERTIFICATE OF CORRECTION

PATENT NO. : 7,315,387 B2  Page 1 of 1
APPLICATION NO. : 09/726404
DATED : January 1, 2008
INVENTOR(S) : Nishikawa It is certified that error appears in the above-identified patent and that said Letters Patent is hereby corrected as shown below:

COLUMN 12:
  Line 53, "and" should be deleted.

COLUMN 13:
  Line 17, "convened" should read -- converted --;
  Line 54, "and" should be deleted; and
  Line 64, "change sthe" should read -- changes the --.

COLUMN 14:
  Line 19, "convened" should read -- converted --; and
  Line 60, "and" should be deleted.

COLUMN 15:
  Line 25, "method" should read -- program --;
  Line 28, "and" should be deleted; and
  Line 42, "claim 16," should read -- claim 20, --.

Signed and Sealed this

Twenty-third Day of September, 2008

JON W. DUDAS
*Director of the United States Patent and Trademark Office*